United States Patent
Klieber

(12) 
(10) Patent No.: US 10,752,316 B2
(45) Date of Patent: Aug. 25, 2020

(54) SUSPENDED TWO-WHEELED VEHICLE FRAME

(71) Applicant: Jochen Klieber, Tacherting (DE)

(72) Inventor: Jochen Klieber, Tacherting (DE)

(*) Notice: Subject to any disclaimer, the term of this patent is extended or adjusted under 35 U.S.C. 154(b) by 57 days.

(21) Appl. No.: 15/678,620

(22) Filed: Aug. 16, 2017

(65) Prior Publication Data

US 2018/0057101 A1 Mar. 1, 2018

(30) Foreign Application Priority Data

Aug. 24, 2016 (EP) .................................... 16185531

(51) Int. Cl.
| | | |
|---|---|---|
| B62K 25/28 | (2006.01) | |
| B62K 19/34 | (2006.01) | |
| B62K 3/02 | (2006.01) | |
| B62J 11/13 | (2020.01) | |

(52) U.S. Cl.
CPC ................ B62K 25/28 (2013.01); B62K 3/02 (2013.01); B62K 19/34 (2013.01); *B62J 11/13* (2020.02)

(58) Field of Classification Search
CPC ........... B62K 25/28; B62K 3/02; B62K 19/34
USPC ....................................................... 280/284
See application file for complete search history.

(56) References Cited

U.S. PATENT DOCUMENTS

| | | | | |
|---|---|---|---|---|
| 7,909,347 B2* | 3/2011 | Earle | .................... | B62K 25/286 280/275 |
| 8,770,608 B1* | 7/2014 | Chamberlain | ......... | B62M 9/135 280/261 |
| 9,469,362 B1* | 10/2016 | Edmonds | ............... | B62K 19/06 |
| 9,840,298 B2* | 12/2017 | Chubbuck | ................ | B62J 99/00 |
| 2005/0046142 A1* | 3/2005 | Chamberlain | ......... | B62K 19/34 280/284 |
| 2008/0258427 A1* | 10/2008 | Buckley | ............... | B62K 25/286 280/284 |
| 2013/0147152 A1* | 6/2013 | Paquin | ................... | B62K 19/34 280/281.1 |
| 2017/0282997 A1* | 10/2017 | Lumpkin | ............... | B62K 19/00 |

FOREIGN PATENT DOCUMENTS

SU 001181930 A1 * 9/1985

* cited by examiner

*Primary Examiner* — Jacob D Knutson
(74) *Attorney, Agent, or Firm* — Lerner, David, Littenberg, Krumholz & Mentlik, LLP

(57) ABSTRACT

A suspended two-wheeled vehicle frame and a corresponding two-wheeled vehicle, in particular a bicycle, are disclosed, in which the swing-arm bearing seat comprises a recess for providing clearance or free space for a rear wheel of the suspended two-wheeled vehicle frame. The yoke of said two-wheeled vehicle frame, which extends from the first to the second chainstay, extends below the swing-arm bearing seat provided with a recess. An opening can be arranged at the base of the recess of the swing-arm bearing seat so as to allow the line to be guided through the frame.

17 Claims, 4 Drawing Sheets

SUSPENDED TWO-WHEELED VEHICLE FRAME

FIELD OF THE INVENTION

The invention relates to suspended two-wheeled vehicle frames, to integrating running wheels into suspended two-wheeled vehicle frames, to guiding lines on suspended two-wheeled vehicle frames, and to a bicycle comprising a suspended two-wheeled vehicle frame.

TECHNOLOGICAL BACKGROUND

In order to increase riding comfort, but also to increase riding safety, bicycle frames are provided with suspended and damped chainstays in addition to suspension forks. By means of different frame designs, impacts caused by unevenness on the riding surface are compensated for by the dynamics of the chainstay, which are largely independent from the stem, i.e. the front part of two-wheeled vehicle frame.

However, along with increased comfort, the suspension of the chainstay also brings numerous problems. By separating the chainstay from the frame, the entire bicycle fundamentally loses rigidity. In addition, full-suspension frames are often heavier than unsuspended frames and require higher maintenance outlay, for example for the rear damping element and the control system thereof. Furthermore, the movement of the chainstay during suspended deflection and rebound can affect the drive of the bicycle. Manufacturers of suspension elements attempt to solve these problems using a series of design measures.

In suspended two-wheeled vehicle frames, a yoke is located between the two chainstays, said yoke being a transverse connection for stabilising the full-suspension frame. Moreover, it has become increasingly popular• in recent times, on account of numerous technical advantages, to use larger running wheels, in particular in Mountain bikes. In this case, in particular 27.5 inch and 29 inch running wheels are used. Similarly, for various reasons, the bicycle tyres used are becoming wider.

SUMMARY OF THE INVENTION

It can be considered an object of the invention to make it possible to better integrate a rear wheel into a full-suspension bicycle frame.

A suspended two-wheeled vehicle frame and a bicycle according to the features of the independent claims are specified. Developments of the invention can be found in the dependent claims and in the following description.

The embodiments described relate both to the suspended two-wheeled vehicle frame and to the bicycle.

Definitions

In the context of the present invention, the term "line" is used, for example, for a Bowden cable comprising a corresponding outer sheath, for a hydraulic line, a pneumatic or an electrical line.

Moreover, the term "spacing between the surface of the line and the axis of rotation" should be understood to mean that the line is not arranged in parallel with the axis of rotation. Rather, the line intersects the axis of rotation at a point of intersection which corresponds to a spacing of 0 mm between the two, or the line and the axis of rotation are askew and/or oblique relative to one another in space, in which case said spacing is the shortest distance between the surface of the line and the axis of rotation.

Moreover, the term "axis of rotation" defines both an actual, physical shaft and also an immaterial, abstract spatial axis of rotation.

According to an embodiment of the invention, a suspended two-wheeled vehicle frame comprising a stem and a swing arm are disclosed. The stem comprises a swing-arm bearing seat and the swing arm comprises a first and a second chainstay. The first and second chainstays are in each case movably fastened to the swing-arm bearing seat of the stem by means of a bearing. Furthermore, the swing-arm bearing seat comprises a recess or groove or indentation for providing clearance/free space/open space for the rear wheel of the suspended two-wheeled vehicle frame. A yoke of the swing arm is arranged between the first and second chainstay. Moreover, the yoke extends from the first chainstay to the second chainstay, below the swing-arm bearing seat.

According to the present invention, the yoke no longer extends between the rear wheel and the swing-arm bearing, but rather below the swing-arm bearing. For example, this can be combined with deep-drawn chainstay heads which extend downwards from the axis of rotation of the bearing. This will be described in more detail in the context of more developed embodiments. Moreover, this embodiment of the invention can be implemented by guiding the line through the down tube and/or seat tube, the guided line extending through the pivot point and/or the axis of rotation of the swing-arm bearing. Further details and advantages relating to this will also be described in the context of specific embodiments.

The recess in the swing-arm bearing seat can be understood to be a cut-out or groove. Overall, the recess of the swing-arm bearing seat provides clearance for the rear wheel and allows additional freedom of access to the tyre, without the chainstays having to be lengthened when using rear wheels of larger diameters. This is advantageous in that the disadvantage that would otherwise occur if the chainstays were lengthened, i.e. in particular that of the wheel becoming very chainstay-heavy with regard to the riding characteristics thereof, is prevented by means of the present invention.

In other words, the present invention therefore provides an alternative to the typical method in the prior art of lengthening the chainstays or of simply moving the right-hand chainstay downwards. This is conventionally done in order to create space for the derailleur and a distance from the chain.

In contrast therewith, the present invention discloses providing a recess in the swing-arm bearing seat of the stem, such that the rear wheel of the two-wheeled vehicle can pass through a clearance provided thereby. The combination of the recess of the swing-arm bearing seat and the new positioning of the yoke below the swing-arm bearing seat therefore provides the advantageous clearance for increasingly larger running wheels, in particular on bicycles. This clearance can also be used as a buffer zone for twisting of the rear wheel. Advantageously, tyre cleaning can also take place in this clearance, whereby stones or dirt are detached from the rear wheel.

According to a further embodiment of the invention, the first chainstay comprises a first chainstay head and the second chainstay comprises a second chainstay head, at which heads the swing arm is fastened to the swing-arm bearing seat. In this case, the first and the second chainstay heads are in each case formed as deep-drawn chainstay heads that extend downwards from the axis of rotation of the bearing.

This embodiment is further clarified in particular in the context of the embodiment shown in FIG. 4. In this case, the term "chainstay head that extends downwards" relates to a direction extending from the axis of rotation of the swing-arm bearing towards the ground on which the bicycle is positioned.

In particular, the combination of the recess in the swing-arm bearing seat, the yoke extending below the swing-arm bearing seat and the two deep-drawn chainstay heads which initially extend downwards from the axis of rotation of the bearing allows for an entirely new provision of more clearance for increasingly large tyres.

In particular, a deep-drawn chainstay head that extends downwards from the axis of rotation of the bearing comprises, within the meaning of the present invention, a first portion that extends from the swing-arm bearing and that adjoins a second, curved portion of the chainstay, which second portion then leads into a straight chainstay course. This can be seen particularly clearly in the side view of FIG. 4.

According to a further embodiment of the invention, the swing-arm bearing seat is formed as an immovable, single-piece, non-pivotable portion of a main frame of a two-wheeled vehicle frame.

The swing-arm bearing seat is therefore an integral component of the stem of the suspended two-wheeled vehicle frame. This can be seen, for example, in the embodiments in FIGS. 1, 2 and 4.

According to a further embodiment of the invention, at least one opening line feedthrough is arranged inside the recess of the swing-arm bearing seat.

An opening of this kind is shown for example in FIGS. 1, 2 and 3. By means of this suspended two-wheeled vehicle frame according to the invention, the line which is guided through the opening can substantially intersect the axis of rotation of the bearing. In this case, the line can, for example, be guided perpendicularly to the axis of rotation or guided so as to extend slightly obliquely relative to the axis of rotation.

Because the line passes through the axis of rotation or through a cylindrical region around the axis of rotation that is slightly spaced apart therefrom and has a radius of 10 mm, an elongation of the line during movement of the swing-arm relative to the stem can be prevented. Because this elongation of the line is minimised or prevented, undesired effects on the components of the two-wheeled vehicle that are controlled using the line can be prevented. Said components can, for example, be brakes, gears, damping elements or devices for changing the seat height.

In this case, the spacing between the surface of the line and the axis of rotation of the bearing also lies within the range of between 0 and 15 mm for example, provided that the frame design used still does not cause any noticeable tensile elongation at a spacing of 15 mm. An important aspect of this embodiment is that the spacing from the axis of rotation is selected such that there is no elongation of the line during an ordinary movement of the two frame elements relative to one another, which elongation would cause an undesired switch to a rear derailleur of the two-wheeled vehicle for example. Furthermore, mechanical abrasion on the two-wheeled vehicle frame and on the line can be prevented or minimised by means of the line guidance according to the invention.

Inside the stem of the suspended two-wheeled vehicle frame, a guide device can be connected at the opening which is arranged inside the recess of the swing-arm bearing seat. In the context of the present invention, the term "guide device" is used to denote a mechanical component that is attached to the two-wheeled vehicle frame for the purpose of spatially guiding the line. The guide device can for example be a component that is welded or soldered onto the two-wheeled vehicle frame and through which the line is guided along a desired spatial course. The guide device can also be a channel, a hole inside the frame element or a guide tube that is inserted into the opening or hole in the swing-arm bearing seat as an insert.

In this case, according to further embodiments, the suspended two-wheeled vehicle frame can comprise two, three, four, or more than four openings for guiding the line.

According to a further embodiment of the invention, a first and a second opening for line feedthrough are arranged inside the recess of the swing-arm bearing seat. In this case, the first and second openings are separated by means of a separating wall. A first and a second line are guided inside the seat tube or down tube of the stem of the suspended two-wheeled vehicle frame. In this case, the first line is guided through the first opening and the second line is guided through the second opening.

In other words, this embodiment permits dual, defined and individual guidance of lines. This advantageous and precise way of guiding lines prevents undesired bending in the clearance region and prevents collisions between the lines and the tyres of the rear wheel. According to the embodiment in FIG. 3, two openings are shown at the base of the recess in the swing-arm bearing seat.

Alternatively, the opening in the recess could also be designed as a slot. In particular, the opening can have a semicircle-straight-semicircle shape.

According to a further embodiment of the invention, the line is guided in the seat tube of the two-wheeled vehicle frame in a straight line as far as the opening.

According to a further embodiment of the invention, the opening is arranged at the base or bottom of the recess, in the swing-arm bearing seat. Furthermore, the base of the recess is offset relative to the axis of rotation of the bearing, towards the front wheel and/or towards the bottom bracket axle.

In other words, the recess in the swing-arm bearing seat extends from a region of the swing-arm bearing seat that faces the rear wheel, inwards towards a region of the swing-arm bearing seat that faces the front wheel. This can be seen, for example, in FIG. 1.

According to a further embodiment of the invention, a line is guided through the at least one opening inside the recess of the swing-arm bearing seat, which line extends from the opening into the interior of the first or second chainstay.

The particular frame geometry of the present invention, i.e. the low-lying yoke that extends below the swing-arm bearing seat, and the recess inside the swing-arm bearing seat, makes possible an optimised line course from the opening in the recess of the swing-arm bearing seat to an opening inside the chainstay. In particular, this embodiment permits a line course in which the line, when guided, is spaced apart from the axis of rotation of the bearing by between 0 and preferably 10 mm. In particular, it is possible to guide the line such that it extends through the pivot point of the bearing. In addition, on account of the recess according the invention in the swing-arm bearing seat, an early lateral course of the line towards the opening in the chainstay is possible after said line has emerged from the opening in the swing-arm bearing seat. A line course of this kind can be seen in particular in FIG. 1. The embodiment in FIG. 2 also shows a line course of this kind.

According to a further embodiment of the invention, the line extends into or enters the interior of the first or second chainstay below the axis of rotation of the bearing, and the line extends into or enters the interior of the first or second chainstay above the yoke.

In particular, in a further embodiment, these two criteria can be met in each case for the first and second chainstay and the relevant entry of a line into the relevant chainstay.

According to a further embodiment of the invention, the first chainstay comprises a first chain-stay head and the second chainstay comprises a second chain-stay head. The swing arm is fastened to the swing-arm bearing seat by means of the chain-stay heads. Furthermore, the first and second chain-stay heads each comprise at least one first, one second and one third outer planar surface in relation to a plane of symmetry of the suspended two-wheeled vehicle frame. The first outer planar surface is at a spacing d1 from the plane of symmetry, the second outer planar surface is at a spacing d2 from the plane of symmetry, and the third outer planar surface is at a spacing d3 from the plane of symmetry. Furthermore, in this embodiment, the relationship d1<d2<d3 applies.

As can be seen for example in the embodiment in FIG. 1, each chain-stay head comprises three outer planar surfaces that rise from the plane of symmetry, in the direction of the axis of rotation of the bearing, towards the rear-wheel receptacle of the relevant chainstay. In this case, the plane of symmetry is provided, by way of example, with reference sign 323 in FIG. 3. The plane of symmetry is therefore the centre plane of the bicycle frame, for example, and divides the bicycle frame along the longitudinal axis into a left-hand and right-hand portion. In relation to this plane of symmetry, the chain-stay heads comprise three or at least three planar surfaces on the outer face of the chainstay and the distance or spacing of the outer planar surface increases from the axis of rotation of the bearing and to the fork end of the chain stay. In other words, the first outer planar surface, which is the closest planar surface to the axis of rotation, is the closest to the plane of symmetry, and the second planar surface, which is further towards the fork end, is at a greater spacing from the plane of symmetry, and the third planar surface is at an even greater spacing from the plane of symmetry. This is shown schematically and by way of example in FIG. 1, on the right-hand chain-stay head. The plane of symmetry 323 is shown and described in FIG. 3. A chain-stay design of this kind has proven to be particularly advantageous when producing a suspended two-wheeled vehicle frame.

This embodiment in particular allows optimisation when using two chain rings. In this case, the embodiment is a three-stage shift of the outer surface of the right-hand chain-stay head. In this case, the first stage is designed as a first plateau, the second stage is designed as a second plateau of which extends substantially in parallel with the first plateau, and the third stage is designed as an oblique surface, the course of which follows the larger chain ring so as to be equidistant from the chain, and which surface provides clearance for the chain if said chain comes off the chain ring.

In this case, the chain-stay heads comprising the three outer planar surfaces that rise towards the rear can be designed in the following manner.

According to a further embodiment of the invention, the suspended two-wheeled vehicle frame comprises a line having an outer surface, the line being guided through the opening in the swing-arm bearing seat. When guided, the outer surface of the line is guided at a spacing of from 0 mm to 10 mm from an axis of rotation of the bearing.

According to a further embodiment of the invention, a bicycle comprising a suspended two-wheeled vehicle frame according to any of the preceding or following embodiments is specified.

According to a further embodiment of the invention, a bicycle that additionally comprises the swing-arm bearing and the rear wheel is specified.

Additionally, it should be noted that "comprising" and "having" do not exclude other elements or steps and "one" or "a" does not exclude a plurality. It should further be noted that features or steps that have been described with reference to one of the above-mentioned embodiments can also be used in combination with other features or steps of other above-described embodiments of the invention. Reference signs in the claims are not to be considered as limiting.

Embodiments of the invention will be described in the following with reference to the drawings.

BRIEF DESCRIPTION OF THE DRAWINGS

In the following description of the drawings, the same or similar reference numerals will be used for the same or similar elements.

Figure 1:
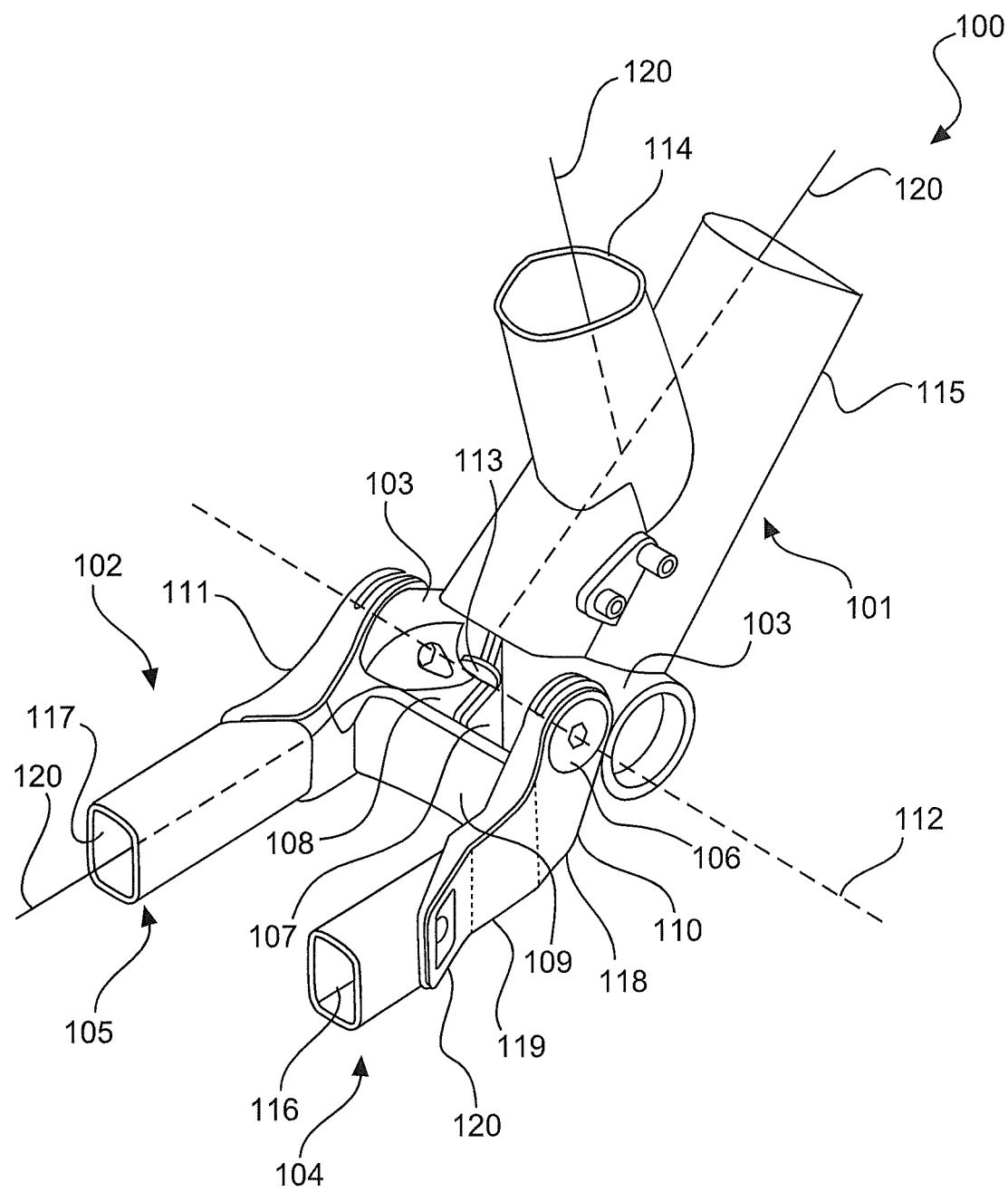
FIG. 1 is a schematic, three-dimensional view of a suspended two-wheeled vehicle frame according to an embodiment of the invention.

The views in the drawings are schematic and not to scale.

DETAILED DESCRIPTION OF EMBODIMENTS

FIG. 1 shows a suspended two-wheeled vehicle frame 100 comprising a stem 101 and a swing arm 102, the stem comprising a swing-arm bearing seat 103. The swing arm 102 comprises a first and a second chainstay 104 and 105. In this case, the first and second chainstay are each movably fastened to the swing-arm bearing seat 103 by means of the bearing 106. The swing-arm bearing seat comprises a recess 107 for providing clearance 108 for a rear wheel (not shown) of the suspended two-wheeled vehicle frame. A yoke 107, which is part of the swing arm, is located between the first and the second chainstay. The yoke extends from the first to the second chainstay, below the swing-arm bearing seat 103. In the embodiment in FIG. 1, a first chain-stay head 101 of the first chainstay and a second chain-stay head 111 of the second chainstay are also shown. The swing arm 102 is fastened to the swing-arm bearing seat 103 by means of said chain-stay heads. As can be seen in this oblique view, the first and second chain-stay heads are each formed as deep-drawn chain-stay heads that extend downwards from the axis of rotation 112 of the bearing 106. In this case, downwards means towards the ground on which the bicycle of said suspended two-wheeled vehicle frame is located.

Moreover, it can be seen in FIG. 1 that the swing-arm bearing seat 103 is formed as an immovable, single-piece, non-pivotable portion of the stem. In addition, an opening 113 for line feedthrough is arranged inside the recess 107 of the swing-arm bearing seat 103. The line 120 is guided through the down tube 115 or the seat tube 114 to the opening 113, and then extends in the clearance provided by the recess 107 in the swing-arm bearing seat, and subsequently enters the second chainstay 105 and is guided therethrough towards the fork end. As can be seen in FIG. 1, the line 120 is guided in the down tube 115 in a straight line. The opening 113 is arranged at the base of the recess. The base of the recess 107 is offset relative to the axis of rotation of the bearing 112, towards the front wheel and/or towards the bottom bracket axle of the two-wheeled vehicle frame 100.

As can further be seen in FIG. 1, the new frame design of the present invention makes it possible to use larger rear wheels without the chain stays having to be lengthened. By means of the combination of the recess in the swing-arm bearing seat with the yoke, which extends below the swing-arm bearing seat, and the deep-drawn chain-stay heads of the chainstays, a large rear wheel can thus be integrated in the frame without having to accept the disadvantageous chain-stay-heaviness that has poor riding characteristics of lengthened chainstays.

The chain-stay head 110 comprises, in relation to a plane of symmetry 323 (see FIG. 3) of the suspended two-wheeled vehicle frame 100, at least one first, one second and one third outer planar surface 118, 119, 120. The first planar surface 118 is at a spacing d1 from the plane of symmetry (see FIG. 3; 323), the second planar surface 119 is at a spacing d2 from the plane of symmetry, and the third planar surface 120 is at a spacing d3 from the plane of symmetry, the relationship d1<d2<d3 applying.

Therefore, in each case, one chain-stay head is provided which extends from the axis of rotation of the swing-arm bearing towards the fork end in two stages further outwards, i.e. away from the plane of symmetry. This does not happen continuously, but rather in two discrete stages by means of the three defined outer planar surfaces 118, 119 and 120.

Figure 2:
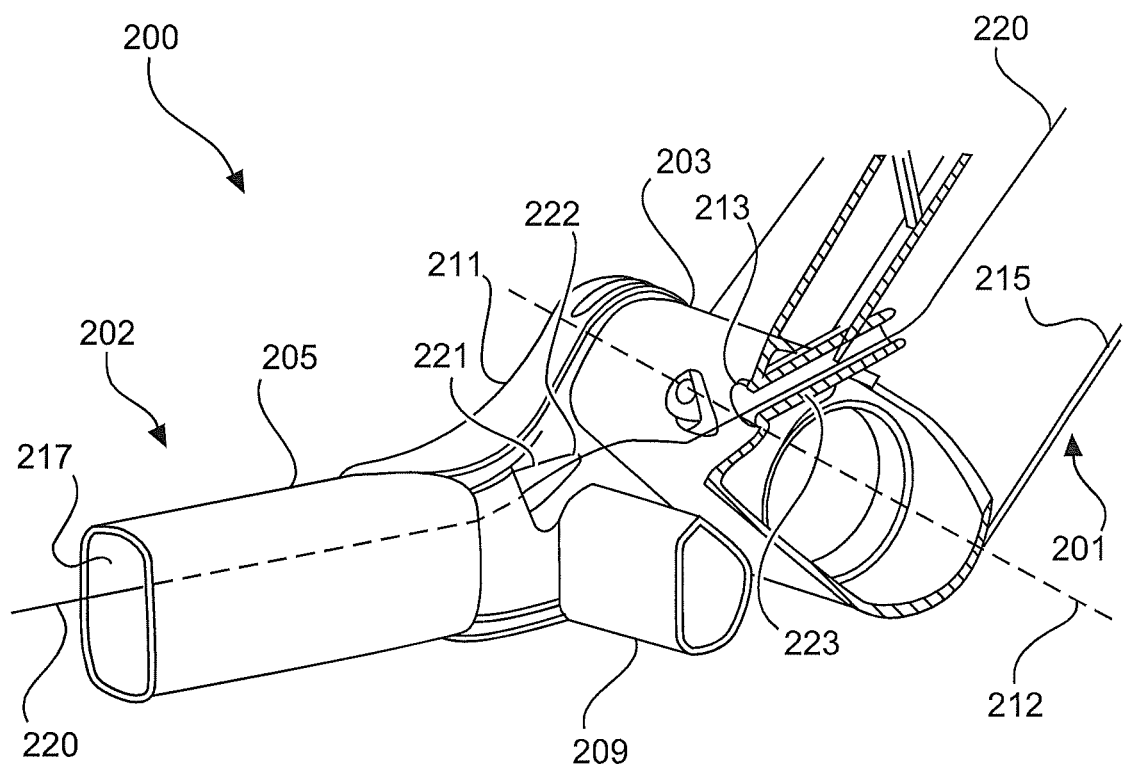
FIG. 2 is a schematic, two-dimensional view of a suspended two-wheeled vehicle frame according to an embodiment of the invention.

FIG. 2 shows a further embodiment of the present invention, in which a suspended two-wheeled vehicle frame 200 comprising a stem 201 and a swing arm 202 is shown. The swing-arm bearing seat 203, which is shown in partial cross-section here, comprises an opening 213 inside the recess of the swing-arm bearing seat, at which opening a guide device 223 is attached. This guide device 223 thus provides a channel through which the line 220 is guided through the suspended two-wheeled vehicle frame to the opening 213. In this case, it can be observed that the line 220 enters 202 into the interior of the second chainstay 205 below the axis of rotation 212 of the bearing, and the line 220 also enters 222 into the interior of the second chainstay above the yoke 209. In a further embodiment, this also applies to a further line, which is guided through the opening 213 but is then guided into the interior of the first chainstay (not shown here). Guiding the line 220 inside 217 the second chainstay 205 ensures a protected and guided line course overall, substantially inside the two-wheeled vehicle frame. Overall, the line 220 is thus guided from the top tube 215 into the guide device 223, through the opening 208, into the opening 221 of the second chainstay 205 and through the interior 217 of the chainstay to the fork end of the second chainstay. By means of the embodiment according to the invention in FIG. 2, it is possible to lay a line on a suspended two-wheeled vehicle frame such that relative movements between the swing arm and the stem cause neither lengthening of the line nor mechanical abrasion in the line-guiding region.

The chain-stay head 211 is also deep-drawn in the embodiment in FIG. 2, since it extends downwards from the axis 212 of the bearing and then leads into a curved region which leads into a region of the second chain stay 205 that is horizontal and/or extends in a straight line. This can be seen clearly in FIG. 2.

Figure 3:
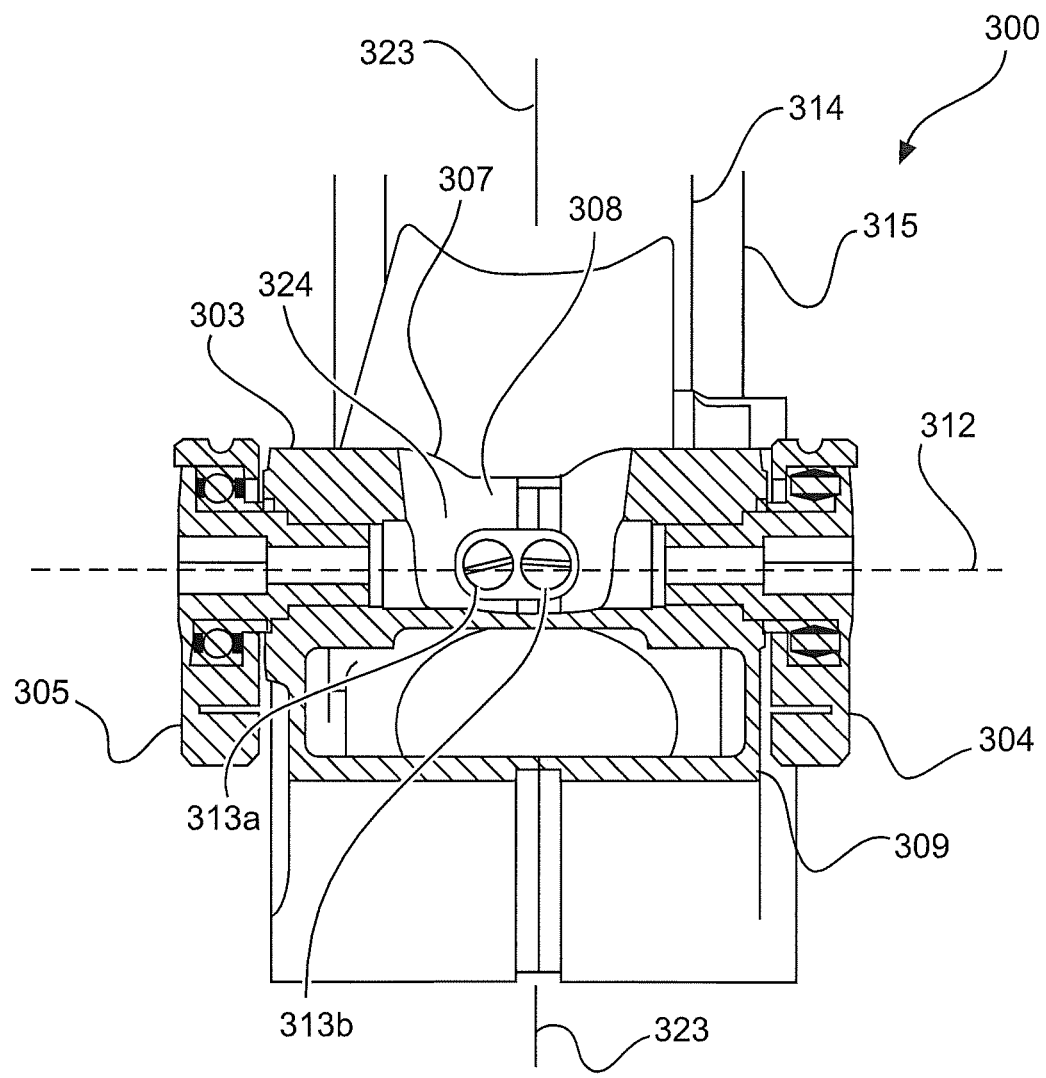
FIG. 3 is a schematic, two-dimensional view of a cross-section through the swing-arm bearing of a suspended two-wheeled vehicle frame according to an embodiment of the invention.

A suspended two-wheeled vehicle frame 300 according to a further specific embodiment is shown in FIG. 3. In this case, a cross-section of the swing-arm bearing seat 303 is shown, by means of which the course of the recess 307 and the clearance 308 provided thereby are more clearly represented graphically. In this embodiment, two openings 313a and 313b are arranged at the base 324 of the recess 307. According to a further embodiment, these two openings can be separated by means of a separating wall. The two chainstays 304 and 305 are likewise shown in cross-section. In this view, the axis of rotation 312 of the swing-arm bearing extends through the centres of both openings 313a and 313b. In this embodiment, too, at least two, or even more, lines can thus be guided in a directed manner and it can be ensured that the lines extend through the pivot point and/or through the axis of rotation 312 of the swing-arm bearing or are at a minimal spacing of, for example, 0 to 10 mm. FIG. 3 also shows the plane of symmetry 323, the bicycle frame being designed to be substantially symmetrical with respect to said plane of symmetry 323, apart from minor asymmetrical deviations.

Figure 4:
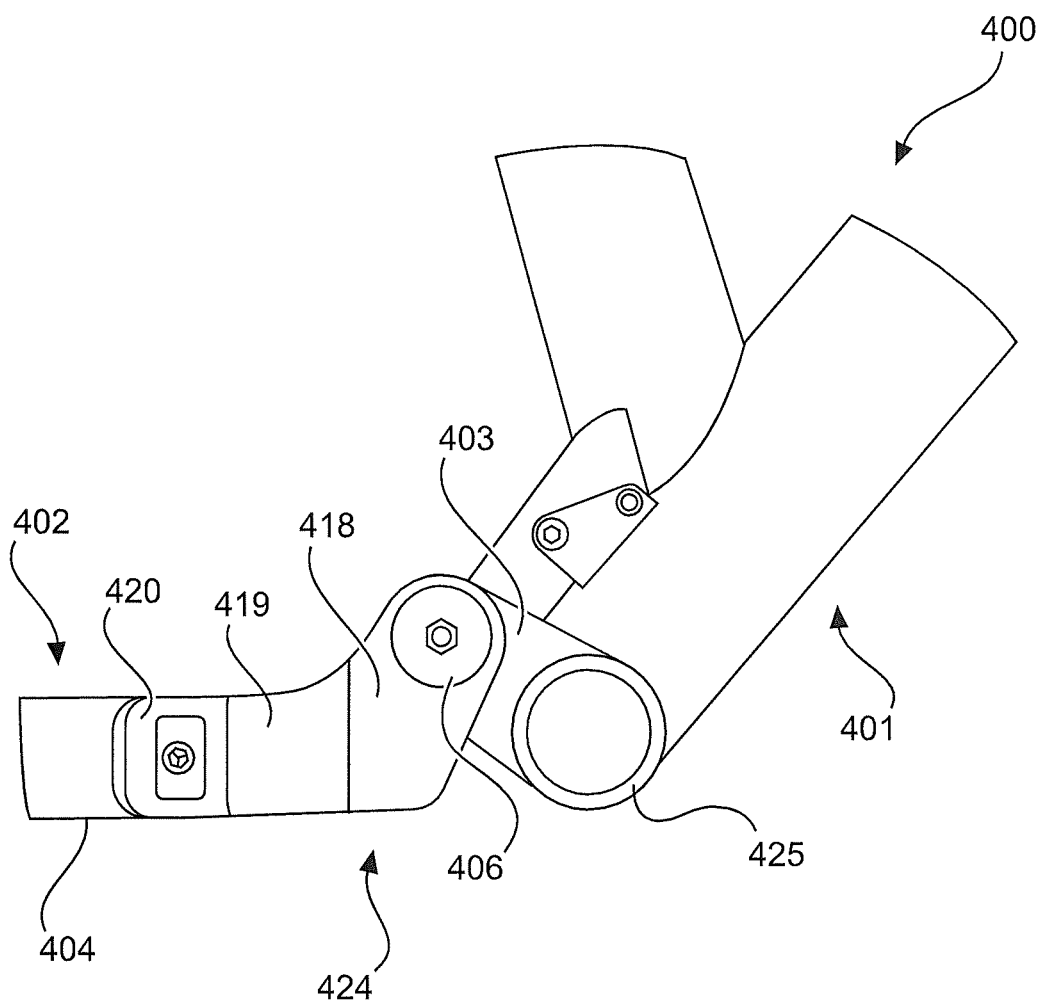
FIG. 4 is a schematic, two-dimensional view of a suspended two-wheeled vehicle frame according to an embodiment of the invention.

A suspended two-wheeled vehicle frame 400 according to a further embodiment is shown in FIG. 4. The two-wheeled vehicle frame comprises a stem 401 and a swing arm 402, and also the two-part swing-arm bearing 406. The swing-arm bearing seat 403 is designed so as to be immovable, a single piece and non-pivotable, as a portion of the main frame of the two-wheeled vehicle frame 400. The bottom bracket housing is denoted by 425. The deep-drawn chain-stay head 424 comprises the adjoining first, second and third planar surfaces 418, 419 and 420. Said surfaces define a first region on the deep-drawn chain-stay head which extends downwards and/or obliquely downwards and which transitions into a curved region which transitions into an adjacent region of the straight or horizontal course. A chain-stay profile can be produced by means of the three planar surfaces 418, 419 and 420, such that the distance of the first outer planar surface from the plane of symmetry of the two-wheeled vehicle frame (see 323 in FIG. 3) is less than that of the second outer planar surface 419. Similarly, the spacing of the outer planar surface 419 from the plane of symmetry is less than that of the third outer planar surface 420.

This embodiment 400 in particular allows optimisation when using two chain rings. In this case, the embodiment is a three-stage shift of the outer surface of the right-hand chain-stay head. In this case, the first stage is designed as a first plateau 418, the second stage is designed as a second plateau 419 which extends substantially in parallel with the first plateau 418, and the third stage 420 is designed as an oblique surface, which, in terms of course, follows the larger chain ring so as to be equidistant from the chain, and which surface provides clearance for the chain when said chain comes off the chain ring.

The invention claimed is:
1. A suspended two-wheeled vehicle frame comprising:
 a stem and a swing arm, wherein the stem comprises a swing-arm bearing seat, wherein the swing arm comprises a first and a second chainstay, wherein the first and second chainstays are each movably fastened to the swing-arm bearing seat by means of a bearing, wherein the swing-arm bearing seat comprises a recess for providing clearance for a rear wheel of the suspended two-wheeled vehicle frame, and wherein a yoke of the swing arm is provided between the first and the second chainstay, and wherein the yoke extends from the first to the second chainstay, below the swing-arm bearing seat; and wherein the swing-arm bearing seat includes two bearing seat arms extending rearward between the first and second chainstays and past forwardmost ends of the first and second chainstays, and the recess is defined between the two bearing seat arms.

2. A suspended two-wheeled vehicle frame according to claim 1, wherein the first chainstay comprises a first chain-stay head and the second chainstay comprises a second chain-stay head, at the heads the swing arm is fastened to the swing-arm bearing seat, and wherein the first and the second chain-stay head are each formed as deep-drawn chain-stay heads that extend downwards from an axis of rotation of the bearing.

3. The suspended two-wheeled vehicle frame according to claim 1, wherein the swing-arm bearing seat is formed as an immovable, single-piece, non-pivotable portion of a main frame of the two-wheeled vehicle frame.

4. The suspended two-wheeled vehicle frame according to claim 1, wherein at least one opening for line feedthrough is arranged inside the recess of the swing-arm bearing seat.

5. The suspended two-wheeled vehicle frame according to claim 4, wherein a first and a second opening for line feedthrough are arranged inside the recess of the swing-arm bearing seat, which openings are separated by means of a separating wall, and wherein a first and a second line are guided inside a seat tube or a down tube of the stem of the suspended two-wheeled vehicle frame, and wherein the first line is guided through the first opening and the second line is guided through the second opening in the swing-arm bearing seat.

6. The suspended two-wheeled vehicle frame according to claim 4, wherein a line is guided in a down tube of the two-wheeled vehicle frame in a straight line to the at least one opening.

7. The suspended two-wheeled vehicle frame according to claim 4, wherein the opening is arranged at the base of the recess, and wherein the base of the recess is offset relative to the axis of rotation of the bearing, towards at least one of a front wheel and a bottom bracket axle.

8. The suspended two-wheeled vehicle frame according to claim 4, wherein a line is guided through the at least one opening, and wherein a line extends from the opening inside the recess of the swing-arm bearing seat into the interior of the first or second chainstay.

9. The suspended two-wheeled vehicle frame according to claim 8, wherein the line enters into the interior of the first or second chainstay below the axis of rotation of the bearing, and wherein the line enters into the interior of the first or second chainstay above the yoke.

10. The suspended two-wheeled vehicle frame according to claim 4, wherein the line comprises an outer surface, and wherein, when guided, the outer surface of the line is at a spacing of between 0 mm and 10 mm from an axis of rotation of the bearing.

11. The suspended two-wheeled vehicle frame according to claim 1, wherein the first chainstay comprises a first chain-stay head and the second chainstay comprises a second chain-stay head, at the heads the swing arm is fastened to the swing-arm bearing seat, and wherein the first and second chain-stay heads each comprise, in relation to a plane of symmetry of the suspended two-wheeled vehicle frame, at least one first, one second and one third outer planar surface, and wherein the first outer planar surface is at a spacing d1 from the plane of symmetry, wherein the second outer planar surface is at a spacing d2 from the plane of symmetry, wherein the third outer planar surface is at a spacing d3 from the plane of symmetry, and wherein the relationship d1<d2<d3 applies.

12. A bicycle comprising the suspended two-wheeled vehicle frame according to claim 1.

13. The bicycle according to claim 12, further comprising the bearing and the rear wheel.

14. A bicycle comprising:
a suspended two-wheeled vehicle frame comprising a stem and a swing arm, wherein the stem comprises a swing-arm bearing seat, wherein the swing arm comprises a first and a second chainstay, wherein the first and second chainstays are each movably fastened to the swing-arm bearing seat by means of a bearing, wherein the swing-arm bearing seat comprises a recess for providing clearance for a rear wheel of the suspended two-wheeled vehicle frame, and wherein a yoke of the swing arm is provided between the first and the second chainstay, and wherein the yoke extends from the first to the second chainstay, below the swing-arm bearing seat; and
a rear wheel extending between the first and second chainstays and into the recess.

15. The bicycle according to claim 14, wherein the swing-arm bearing seat includes two bearing seat arms extending rearward between the first and second chainstays, and the recess is defined between the two bearing seat arms.

16. A suspended two-wheeled vehicle frame comprising a stem and a swing arm, wherein the stem comprises a swing-arm bearing seat, wherein the swing arm comprises a first and a second chainstay, the swing-arm bearing seat further comprising two bearing seat arms extending rearward between the first and second chainstays, wherein the first and second chainstays are each movably fastened to the swing-arm bearing seat by means of a bearing, wherein the swing-arm bearing seat comprises a recess defined between the two bearing seat arms for providing clearance for a rear wheel of the suspended two-wheeled vehicle, and wherein a yoke of the swing arm is provided between the first and the second chainstay, and wherein the yoke extends from the first to the second chainstay, below the swing-arm bearing seat.

17. The bicycle comprising a suspended two wheeled vehicle frame according to claim 16, further comprising a rear wheel extending between the first and second chainstays and into the recess.

* * * * *